(12) United States Patent
Xu et al.

(10) Patent No.: US 12,718,052 B2
(45) Date of Patent: Aug. 25, 2026

(54) DUAL-BAND RADIO FREQUENCY IDENTIFICATION TAG ANTENNA FOR METALLIC OBJECTS

(71) Applicant: Nanyang Technological University, Singapore (SG)

(72) Inventors: Rui Xu, Singapore (SG); Zhongxiang Shen, Singapore (SG); Jingyuan Tan, Herzogenaurach (DE); Benaya Christo, Herzogenaurach (DE); Boon Siew Han, Herzogenaurach (DE)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 18/994,602

(22) PCT Filed: Jul. 24, 2023

(86) PCT No.: PCT/SG2023/050514
§ 371 (c)(1),
(2) Date: Jan. 14, 2025

(87) PCT Pub. No.: WO2024/025467
PCT Pub. Date: Feb. 1, 2024

(65) Prior Publication Data

US 2026/0017481 A1 Jan. 15, 2026

(30) Foreign Application Priority Data

Jul. 27, 2022 (SG) ........................... 10202250604U

(51) Int. Cl.
*G06K 19/077* (2006.01)
*H01Q 5/30* (2015.01)
*H01Q 9/16* (2006.01)

(52) U.S. Cl.
CPC ......... *G06K 19/07773* (2013.01); *H01Q 5/30* (2015.01); *H01Q 9/16* (2013.01)

(58) Field of Classification Search
CPC ....... G06K 19/07773; H01Q 5/30; H01Q 9/16
See application file for complete search history.

(56) References Cited

FOREIGN PATENT DOCUMENTS

CN 203858652 U 10/2014
CN 108334923 A 7/2018
(Continued)

OTHER PUBLICATIONS

Mun, et al., "A Compact Dual-Band RFID Tag Antenna Mountable on Metallic Objects", International Journal of Antennas and Propagation, vol. 2015, Issue 1, Jan. 2015, available at https://onlinelibrary.wiley.com/doi/epdf/10.1155/2015/131908 (Year: 2015).*
(Continued)

*Primary Examiner* — Matthew Mikels
(74) *Attorney, Agent, or Firm* — Conley Rose, P.C.

(57) ABSTRACT

A dual-band RFID tag antenna for mounting on a metallic object includes a dielectric substrate having first and second surfaces; a conductive layer on the first surface that is configured to be attached to a surface of the metallic object; an integrated circuit on the second surface; an antenna structure formed on the second surface that is configured to have a first resonance at a first frequency band and a second resonance at a second frequency band; a loop feed structure formed on the second surface that is configured to electromagnetically couple the antenna structure to the integrated circuit; first and second via pins passing through the dielectric substrate and electrically connecting a first point on the antenna structure with a corresponding first point on the conductive layer and a second point on the antenna structure with a corresponding second point on the conductive layer, respectively.

14 Claims, 8 Drawing Sheets

(56) References Cited

FOREIGN PATENT DOCUMENTS

| | | | |
|---|---|---|---|
| CN | 215068307 | U | 12/2021 |
| WO | 2024025467 | A1 | 2/2024 |

OTHER PUBLICATIONS

Foreign Communication from a Related Counterpart Application, International Search Report and Written Opinion dated Dec. 26, 2023, International Application No. PCT/SG2023/050514 filed on Jul. 24, 2023.

Mun, et al., "A Compact Dual-Band RFID Tag Antenna Mountable on 1-13 Metallic Objects", International Journal of Antennas and Propagation, Feb. 23, 2015, vol. 2015, No. 131908, pp. 1-8, [Retrieved on Dec. 20, 2023] DOI: 10.1155/2015/131908.

Chen, et al., "Low-Profile PIFA Array Antennas for UHF Band RFID Tags Mountable on Metallic Objects", IEEE Transactions on Antennas and Propagation, Apr. 1, 2010, vol. 58, No. 4, pp. 1087-1092, [Retrieved on Dec. 20, 2023] DOI: 10.1109/TAP.2010.2041158.

* cited by examiner

DUAL-BAND RADIO FREQUENCY IDENTIFICATION TAG ANTENNA FOR METALLIC OBJECTS

CROSS-REFERENCE TO RELATED APPLICATIONS

The present application is a filing under 35 U.S.C. 371 as the National Stage of International Application No. PCT/SG2023/050514, filed Jul. 24, 2023, entitled "DUAL-BAND RADIO FREQUENCY IDENTIFICATION TAG ANTENNA FOR METALLIC OBJECTS," which claims priority to Singapore Application No. 10202250604U filed with the Intellectual Property Office of Singapore on Jul. 27, 2022, both of which are incorporated herein by reference in their entirety for all purposes.

TECHNICAL FIELD

The present disclosure relates to radio frequency identification (RFID) tags and in particular RFID tag antennas for mounting on metallic objects.

BACKGROUND

Nowadays, the rapid advancement of radio frequency identification (RFID) technology has attracted much attention. Because of the long-range identification ability of RFID tags in the ultra-high frequency (UHF) band, they have been widely implemented for supply chain management, inventory checking, assets tracking, gate automation, etc.

However, many applications require RFID tags to be mounted on electrically conductive metallic objects, such as motor vehicle, cylinders, containers, weapons, and equipment and so on. When ordinary UHF tags are placed on a metal surface, their reading range is severely degraded owing to impedance mismatching, lower radiation efficiency, and deteriorated directivity. Therefore, so-called anti-metal tags must be specifically designed to overcome these challenges.

Previously, tags have been proposed for the UHF RFID band based on a microstrip-patch-type antenna that has its own ground plane. However, this results in a very large antenna size, having a resonance length is close to one-quarter wavelength, making it difficult to mount on a small metal object. Many dipole-like and folded tags have been designed for miniaturization, but the size of the tag antenna is still large, and this kind of antenna is composed of multiple layers, resulting in a weak structure. In some special compact metal platforms, such as metal cylinders and bearings, the tag antenna is required to be conformally designed. Due to their large size and unstable structure, the above designs are difficult to implement with conformal design. In addition, few dual-band UHF RFID anti-metal tag antennas have been reported in the past few decades.

SUMMARY

According an aspect of the present disclosure, a dual-band RFID tag antenna for mounting on a metallic object is provided. The dual-band RFID tag antenna comprises: a dielectric substrate having a first surface and a second surface opposing the first surface; a conductive layer provided on the first surface of the dielectric substrate, the conductive layer being configured to be attached to a surface of the metallic object; an integrated circuit mounted on the second surface of the dielectric substrate; an antenna structure formed on the second surface of the dielectric substrate, the antenna structure configured to have a first resonance at a first frequency band and a second resonance at a second frequency band; a loop feed structure formed on the second surface of the dielectric substrate, the feed loop structure configured to electromagnetically couple the antenna structure to the integrated circuit; a first via pin passing through the dielectric substrate and electrically connecting a first point on the antenna structure with a corresponding first point on the conductive layer; and a second via pin passing through the dielectric substrate and electrically connecting a second point on the antenna structure with a corresponding second point on the conductive layer.

The first resonance and the second resonance allow the dual-band RFID tag antenna to operate in different UHF band applications, for example in both the US band of 902 to 928 MHz and the EU band of 865 to 868 MHz. Further, the provision of the conductive layer on the first surface of the dielectric substrate allows the dual-band RFID tag antenna to be mounted on metallic objects.

In an embodiment, the dielectric substrate is formed from a flexible material. This allows the dual-band RFID tag antenna to be mounted on both planar metallic objects and curved metallic objects such as cylindrical bearings.

In an embodiment, the first resonance is an omnidirectional resonance and the second resonance is directional resonance.

In an embodiment, the antenna structure comprises two antenna parts arranged in a dipole structure.

In an embodiment, each antenna part comprises a first leg portion and a second leg portion. A resonant length of each antenna part may correspond to a length from an end of the first leg portion to an end of the second leg portion.

The end of the first leg portion of a first antenna part may correspond to the first point on the antenna structure and the end of the first leg portion of a second antenna part may correspond to the second point on the antenna structure.

Second leg portion of each antenna part may comprise a bend towards a non-peripheral part of the second surface of the dielectric substrate. This allows the length of the second leg portion to be increased without increasing the overall dimensions of the dual-band RFID tag antenna.

In an embodiment, the dielectric substrate is rectangular. The first point on the antenna structure and the second point on the antenna structure may correspond to diagonally opposite corners of the dielectric substrate.

In an embodiment, the antenna structure comprises coupling portions arranged adjacent to the loop feed structure. The coupling portions may have a straight edge on a side facing the loop feed structure and/or a stepped edge on a side facing away from the loop feed structure. The straight and stepped edges may be introduced for impedance matching.

BRIEF DESCRIPTION OF THE DRAWINGS

In the following, embodiments of the present invention will be described as non-limiting examples with reference to the accompanying drawings in which.

DETAILED DESCRIPTION

The present disclosure provides an RFID tag antenna which can operate in two UHF band applications. For example embodiments may be able to operate in both the EU band: 865-868 MHZ, and the US band: 902-928 MHz. In these applications the dual-band RFID tag antenna can be mounted on metal platforms with different shapes and size, such as planar metal plate, metal cylinders, containers, bearings and so on.

Figure 1A:
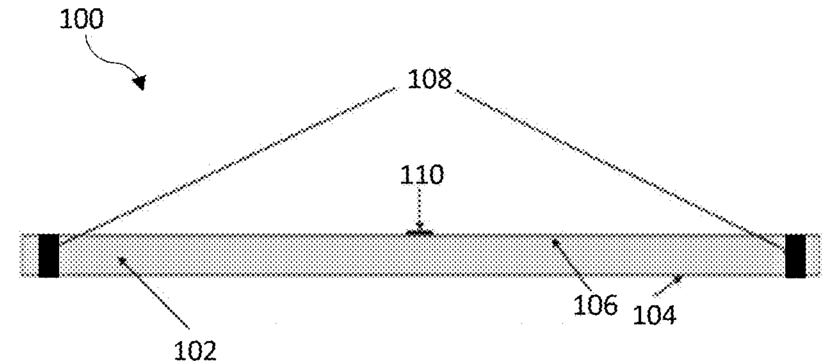
FIG. 1A shows a cross-sectional view of a dual-band RFID tag antenna according to an embodiment of the present invention.
Figure 1B:
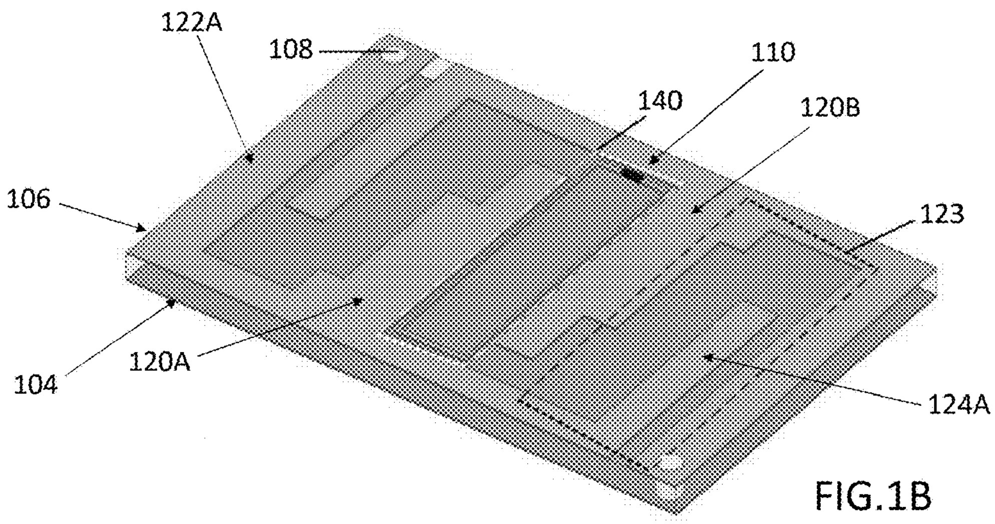
FIG. 1B shows a perspective view of a dual-band RFID tag antenna according to an embodiment of the present invention.
Figure 1C:
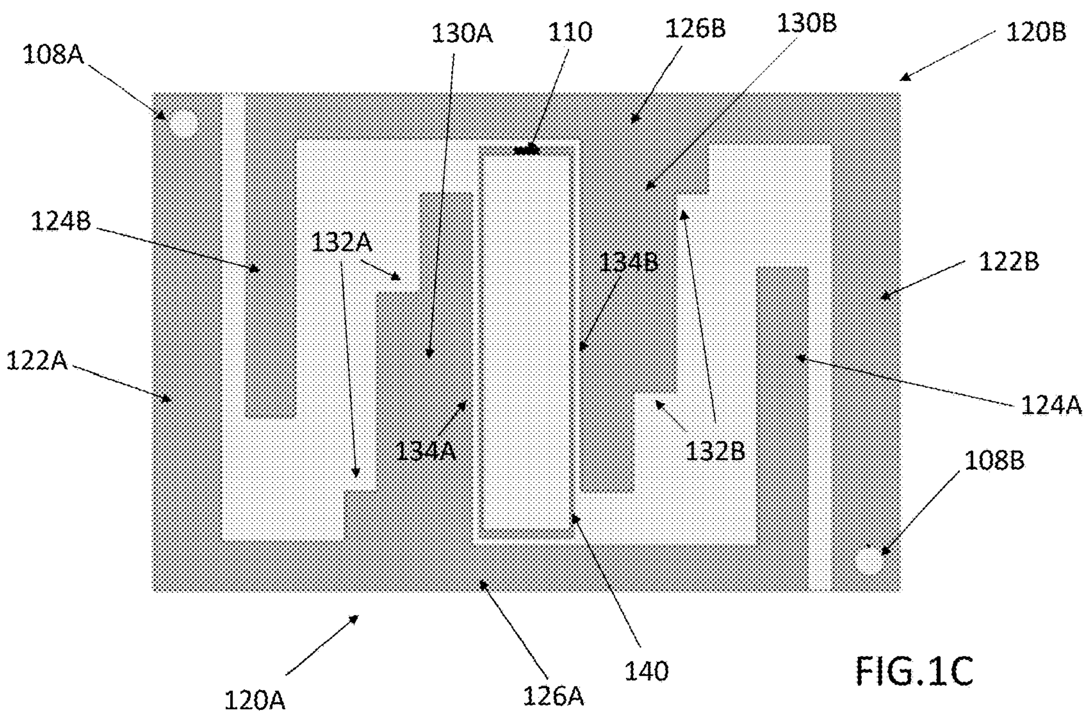
FIG. 1C shows a top down view of a dual-band RFID tag antenna according to an embodiment of the present invention.

FIG. 1A to FIG. 1C show a dual-band RFID tag antenna according to an embodiment of the present invention. FIG. 1A is a cross-sectional view, FIG. 1B is a perspective view and FIG. 1C is a top view.

As shown in FIG. 1A, the dual-band RFID tag antenna 100 comprises a dielectric substrate 102. In order to allow the dual-band RFID tag antenna 100 to operate in both planar metal platforms and curved metal platforms, the dielectric substrate 102 is formed from a flexible material. For example, the material Arlon AD430 may be selected. Any plastic material may be used for the dielectric substrate 102. In one exemplary embodiment, the dimensions of the dielectric substrate 102 are 20 mm×30 mm×1.5 mm.

The dual-band RFID tag antenna 100 is fabricated with printed circuit board (PCB) technology. A lower surface conductive coating 104 is applied to the lower surface of the dielectric substrate 102. The lower surface conductive coating 104 covers the lower surface of the dielectric substrate 102. An upper surface conductive coating 106 is applied to the upper surface of the dielectric substrate 102 and the upper surface conductive coating forms antenna and loop feed structures which are described in more detail below. Via pins 108 pass through the dielectric substrate 102 and form conductive connections between the lower surface conductive coating 104 and the upper surface conductive coating 106. An integrated circuit chip 110 is mounted on the upper surface of the dielectric substrate 102 and connected to parts of the upper surface conductive coating 106. The integrated circuit 110 is a RFID tag integrated circuit such as an Alien Higgs 9 (AH-9) tag chip.

As shown in FIG. 1B, the integrated circuit chip 110 coupled to a loop feed 140 which is arranged at the center of the upper surface of the dielectric substrate 102. The dual-band RFID tag antenna 100 is rectangular and via pins 108 are located at diagonally opposite corners of the dual-band RFID tag antenna 100 (in FIG. 1B, the top left corner and the bottom right corner). The via pins 108 connect the upper surface conductive coating 106 to the lower surface conductive coating 104.

The upper surface conductive coating 106 forms a first antenna portion (or first antenna part) 120A, a second antenna portion (or second antenna part) 120B and the loop feed 140. As shown in FIG. 1B, the first antenna portion 120A has a first leg portion 122A and a second leg portion 124A, and the second leg portion 124A forms an overlapping section 123 which follows a path inside the second antenna portion 120B. This overlapping arrangement allows the effective length of the first antenna portion 120A to be increased without increasing the overall dimensions of the dual-band RFID tag antenna 100.

To reduce the size of the dual-band RFID tag antenna 100, the two via pins 180 are used to connect the top and bottom conductive surfaces at the edge of the dielectric substrate, changing the tag radiation form from dipole-like structure to planar inverted-F antenna (PIFA).

FIG. 1C is a top view of the dual-band RFID tag antenna 100 showing the layout of the upper surface conductive coating 106. The upper surface conductive coating 106 forms a dipole like structure which is rotationally symmetric around the loop feed 140 at the center of the upper surface. The layout of the surface conductive coating 106 is made up of the first antenna portion 120A, the second antenna portion 120B and the loop feed 140. As mentioned above, the first antenna portion 120A and the second antenna portion 120B are rotationally symmetric by 180 degrees around the loop feed 140 at the center of the upper surface.

The first antenna portion 120A comprises a first leg portion 122A which runs from the top left hand corner of the upper surface as shown in FIG. 1C where there is a connection with one of the via pins 108A, across the width of the upper surface to the bottom left corner of the upper surface. A second leg portion 124A of the first antenna portion 120A is located close to the right hand edge of the upper surface, but separated from the right hand edge of the upper surface by the second antenna portion 120B. The first leg portion 122A and the second leg portion 124A of the first antenna portion 120A are connected by a central portion 126A of the first antenna portion 120A which runs along the bottom edge of the upper surface. A coupling portion 130A of the first antenna portion 120A runs from the central portion 126A of the first antenna portion 120A upwards.

The coupling portion 130A runs adjacent to the loop feed 140. The coupling portion 130A has a stepped edge 132A which faces away from the loop feed 140 and straight edge 134A which faces the loop feed 140. The stepped edge 132A and the straight edge 134A are introduced for impedance matching.

Similarly, the second antenna portion 120B comprises a first leg portion 122B which runs from the bottom right corner of the upper surface where there is a connection with the other one of the via pins 108B. The first leg portion 122B of the second antenna portion 120B runs from the bottom right corner to the top right corner of the upper surface. A second leg portion 124B of the second antenna portion 120B is located close to the left hand edge of the upper surface, but separated from the edge by the first leg portion 122A of the first antenna portion 120A. The first leg portion 122B and the second leg portion 124B of the second antenna portion 120B are connected by a central portion 126B of the second radiator portion 120B which runs along the top edge of the upper surface. A coupling portion 130B of the second radiator portion 120B runs from the central portion 126B of the second radiator portion 120B downwards. The coupling portion 130B runs adjacent to the loop feed 140. The coupling portion 130B has a stepped edge 132B which faces away from the loop feed 140 and straight edge 134B which faces the loop feed 140. The stepped edge 132B and the straight edge 134B are introduced for impedance matching.

The shape of the openings formed between the coupling portions 130A and 130B and the second leg portions 124A and 124B may be varied to optimize the tag antenna input impedance. This provides additional parameters to adjust the impedance so that a good impedance matching can be obtained.

The integrated circuit 110 is coupled to the loop feed 140.

Figure 2:
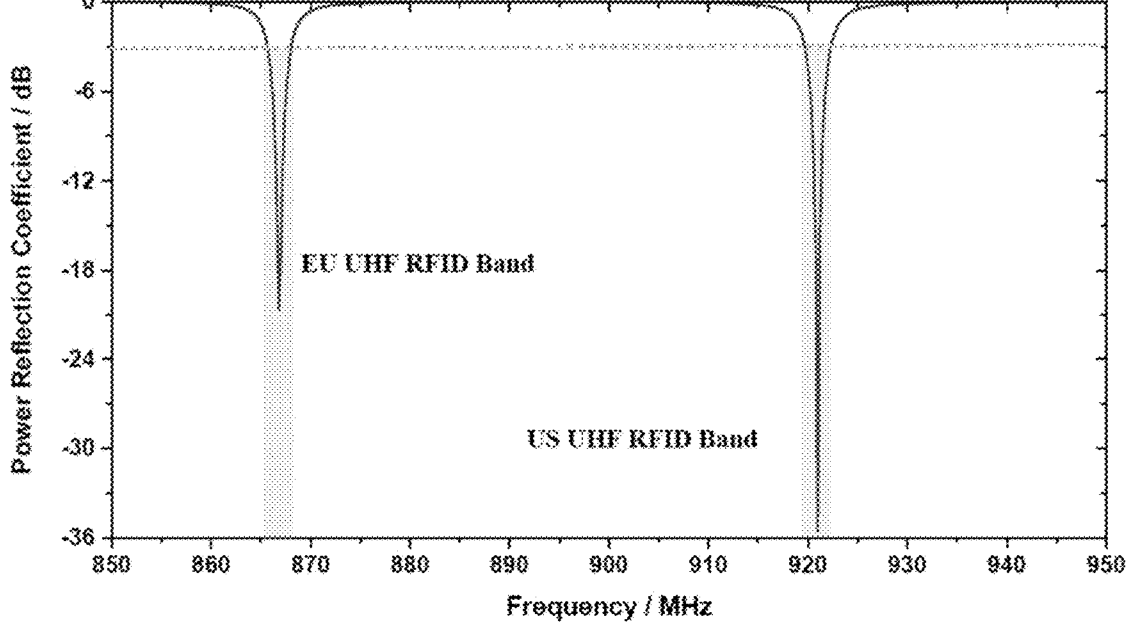
FIG. 2 shows the simulated power reflection coefficient of a dual-band RFID tag antenna according to an embodiment of the present invention.

FIG. 2 shows the simulated power reflection coefficient of a dual-band RFID tag antenna according to an embodiment of the present invention. As shown in FIG. 2, the antenna can generate two resonant frequencies at 866 and 920 MHz. The power reflection coefficient (PRC)<−3.0 dB bandwidth of the designed tag antenna are from 911.2 to 915.8 MHz and from 918.5 to 921.5 MHz.

Figure 3A:
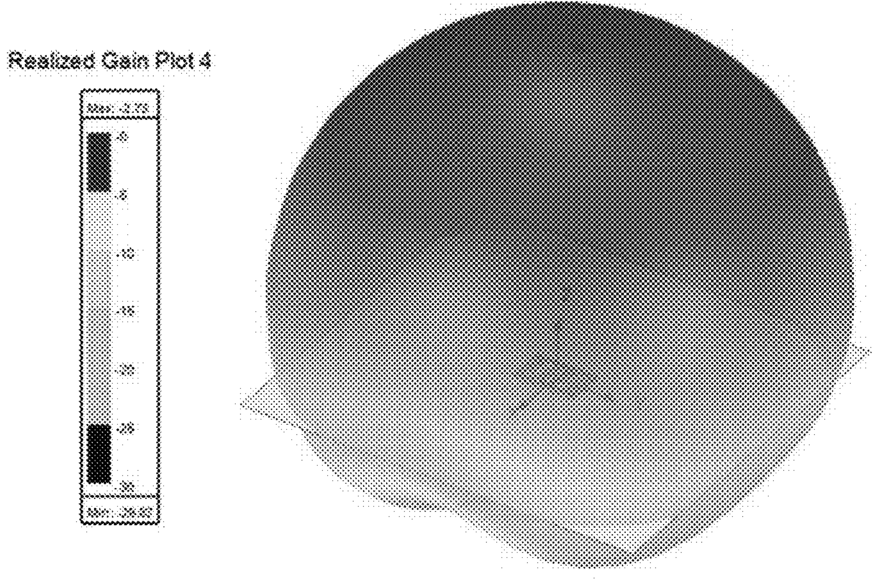
FIG. 3A and FIG. 3B show simulated radiation patterns at 866 MHz and 920 MHZ respectively of a dual-band RFID tag antenna according to an embodiment of the present invention.
Figure 3B:
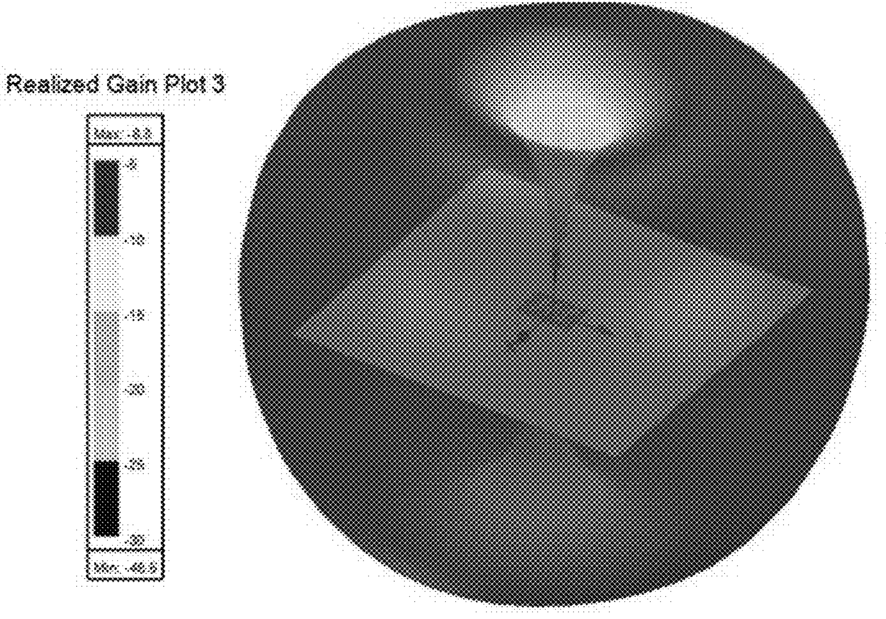

FIG. 3A and FIG. 3B show simulated radiation patterns at 866 MHz and 920 MHZ respectively of a dual-band RFID tag antenna according to an embodiment of the present invention. The maximum gain is −2.73 dBi along the boresight direction at 866 MHz, meaning this tag antenna has a directional radiation pattern at this frequency. While the maximum gain occurs at 45° deviation from the normal direction and the gain is-6.8 dBi at 920 MHz, this tag antenna has an omnidirectional radiation pattern at this frequency.

Figure 4A:
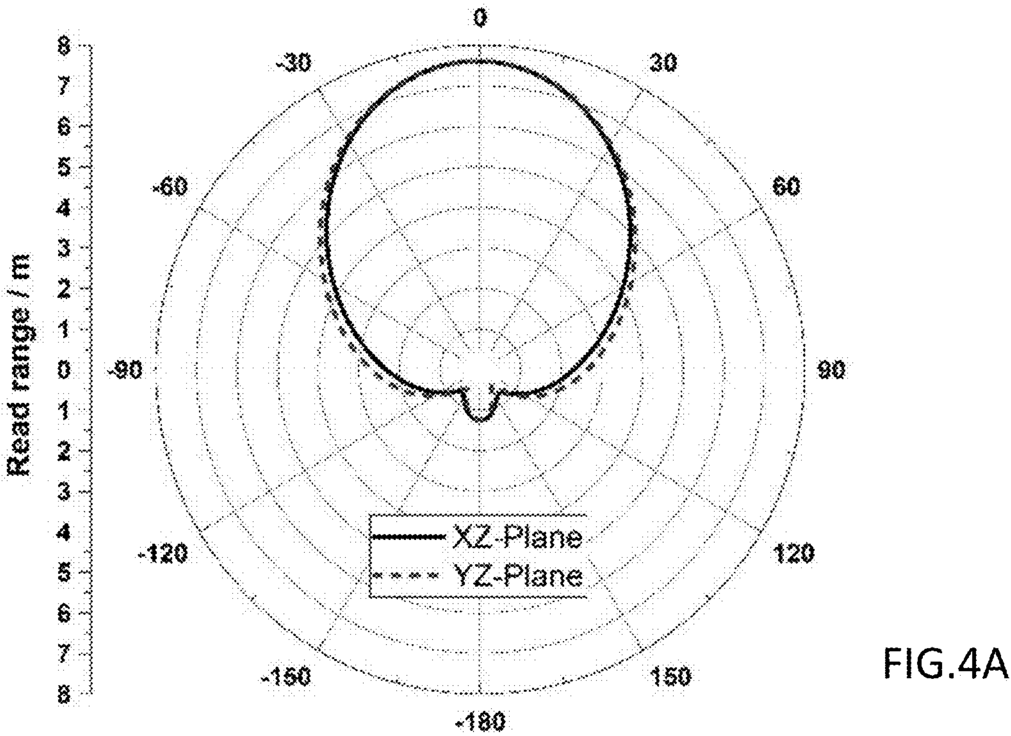
FIG. 4A and FIG. 4B show simulated read range at 866 MHz and 920 MHz respectively of a dual-band RFID tag antenna according to an embodiment of the present invention.
Figure 4B:
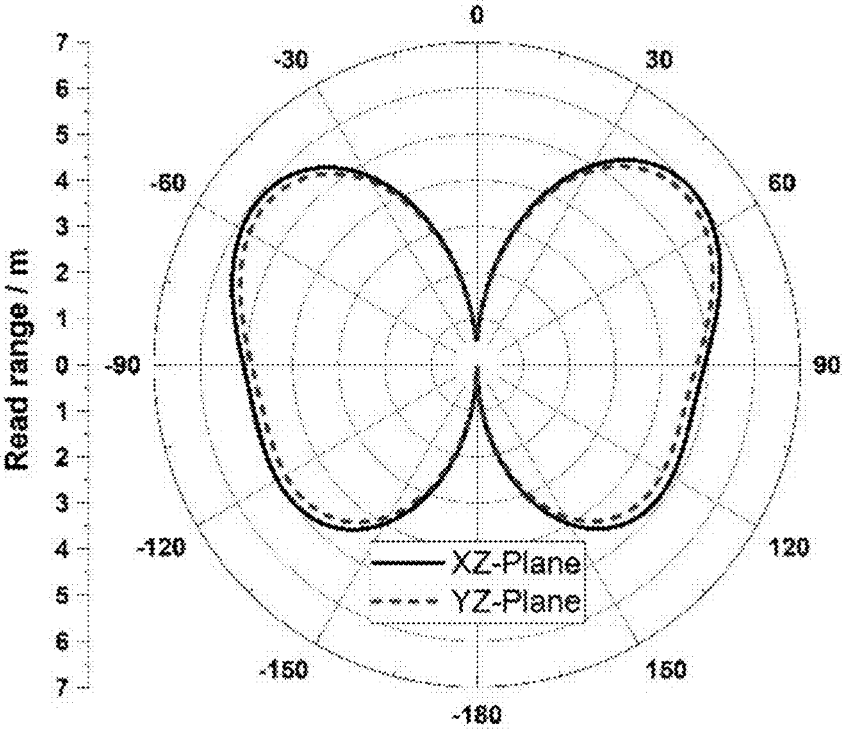

FIG. 4A and FIG. 4B show simulated read range at 866 MHz and 920 MHz respectively of a dual-band RFID tag antenna according to an embodiment of the present invention. The maximum read range at 866 MHz is about 7.5 m when this tag is placed above a 15 cm×15 cm planar ground, and maximum read range is about 6.0 m at 920 MHz.

Figure 5:
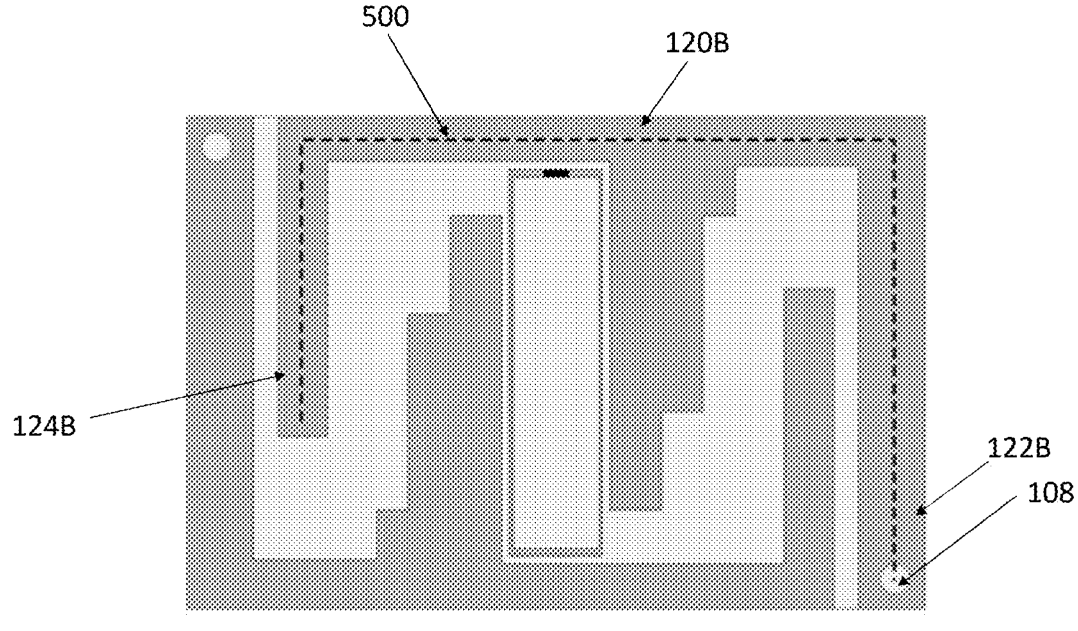
FIG. 5 shows a resonant length of a dual-band RFID tag antenna according to an embodiment of the present invention.

FIG. 5 shows a resonant length of a dual-band RFID tag antenna according to an embodiment of the present invention. As shown in FIG. 5, the resonant length is the length of the second antenna portion 120B (which is equal to the length of the first antenna portion 120A). The length runs from the end of the first leg portion 122B which corresponds to one of the via pins 108 to the end of the second leg portion 124B.

In general, the resonant length of an antenna is about half wavelength. Short pin loading means that adding the via pins 108 to the PIFA antenna structure can effectively reduce the effective length of the antenna. By reducing the resonance length to about a quarter wavelength, the antenna can achieve resonance at UHF frequencies. This approach helps to reduce the overall size of the tag while maintaining proper resonance. Thus, the resonant length 500 shown in FIG. 5 corresponds to a quarter of the resonant wavelength. It is noted that the overlap of the second leg portion 124B allows the dual-band RFID tag antenna to be further miniaturized.

Figure 6A:
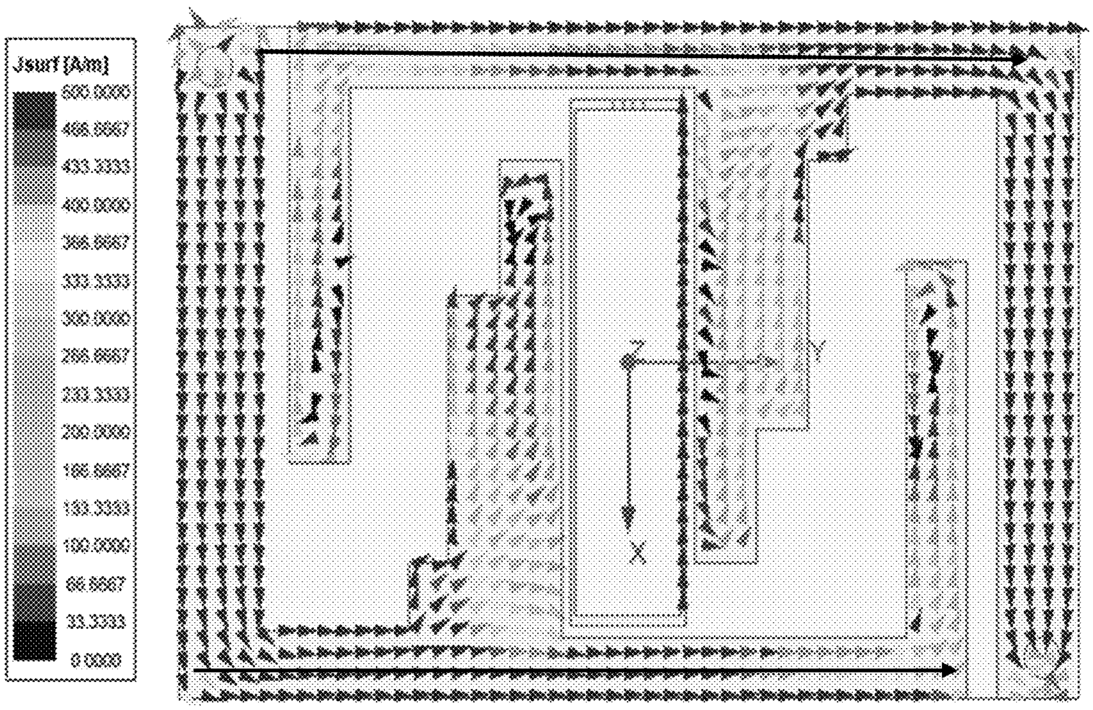
FIG. 6A and FIG. 6B show current distribution at 866 MHz and 920 MHz respectively in a dual-band RFID tag antenna according to an embodiment of the present invention.
Figure 6B:
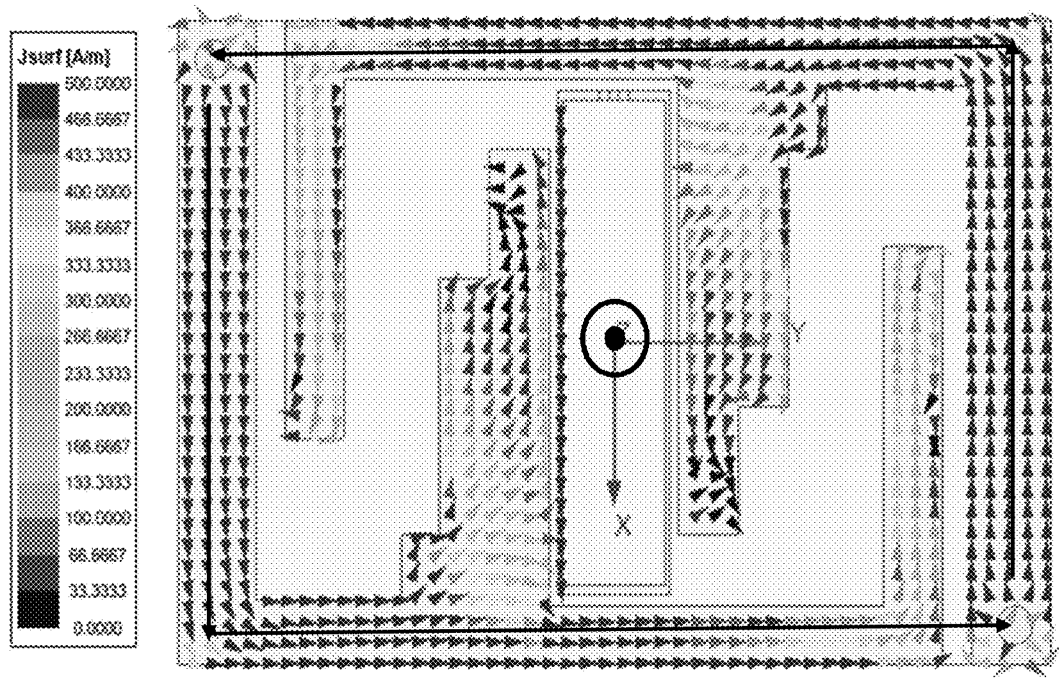

FIG. 6A and FIG. 6B show current distribution at 866 MHz and 920 MHz respectively in a dual-band RFID tag antenna according to an embodiment of the present invention.

When operating at 866 MHZ, as shown in FIG. 6A, the antenna has a directional radiation pattern. The basic principle of a directional radiating tag with electric dipole current is to create a spatial distribution of electric current along the antenna elements. A reflector operates based on the principle of reflecting and focusing electromagnetic waves in a specific direction, thereby increasing the tag's directivity and gain. The reflector serves as a passive element that redirects and concentrates the radiated energy in the desired direction, enhancing the antenna's performance.

When operating at 920 MHz, as shown in FIG. 6B, the antenna has an omni-directional radiation pattern. The basic principle of the omni-directional radiating tag is with loop surface current to create a balanced current distribution along the loop structure, which leads to radiation in all directions. The loop antenna should be designed to resonate at the desired operating frequency. Resonance occurs when the electrical length of the loop corresponds to half-wavelength or multiple half-wavelengths of the operating frequency. The loop tag should exhibit a balanced distribution of surface current along its circumference. This means that the magnitude and phase of the current flowing through different sections of the loop should be relatively equal.

Figure 7:
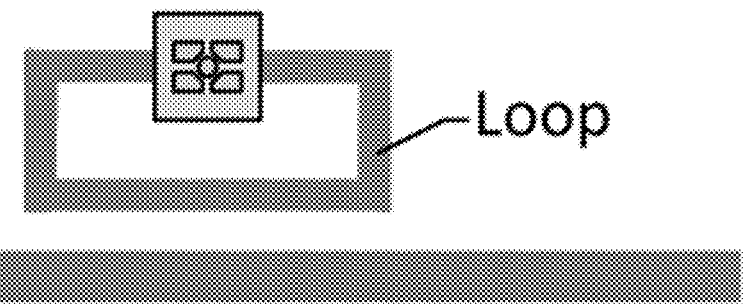
FIG. 7 shows a loop feed matching network.

FIG. 7 shows a loop feed matching network. As shown in FIG. 7 the RFID tag antenna may be considered to be the integrated circuit 110 chip coupled to a radiator.

Loop-Matching is an impedance matching network that comprises a loop feed structure coupled to the feed line of the tag antenna. The component values can be determined using the following equations:

$$L = \frac{1}{2\pi f\sqrt{C_{in} \times C_{out}}}$$

$$C = \frac{1}{4\pi^2 f^2 L Z_{in}}$$

Where L is the inductor value, C is the Capacitor value, $C_{in}$ and $C_{out}$ are the input and output capacitances of the tag antenna, respectively. $Z_{in}$ is the desired input impedance of the tag antenna and f is the operating frequency. The actual component values may need to be adjusted or fine-tuned through simulation or experimental iterations.

Figure 8:
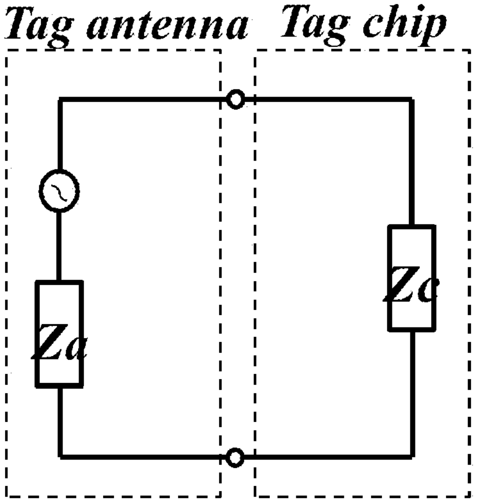
FIG. 8 shows the impedances of the tag antenna and tag chip.

FIG. 8 shows the impedances of the tag antenna and tag chip. As shown in FIG. 8, the tag antenna has an impedance Za:

$$Z_a = R_a + jX_a$$

and the tag chip has an impedance $Z_c$.

$$Z_c = R_c + jX_c$$

In order for the maximum power transfer, the complex conjugates of the impedances should be matched:

$$Z_a = Z_c^*$$

Figure 9:
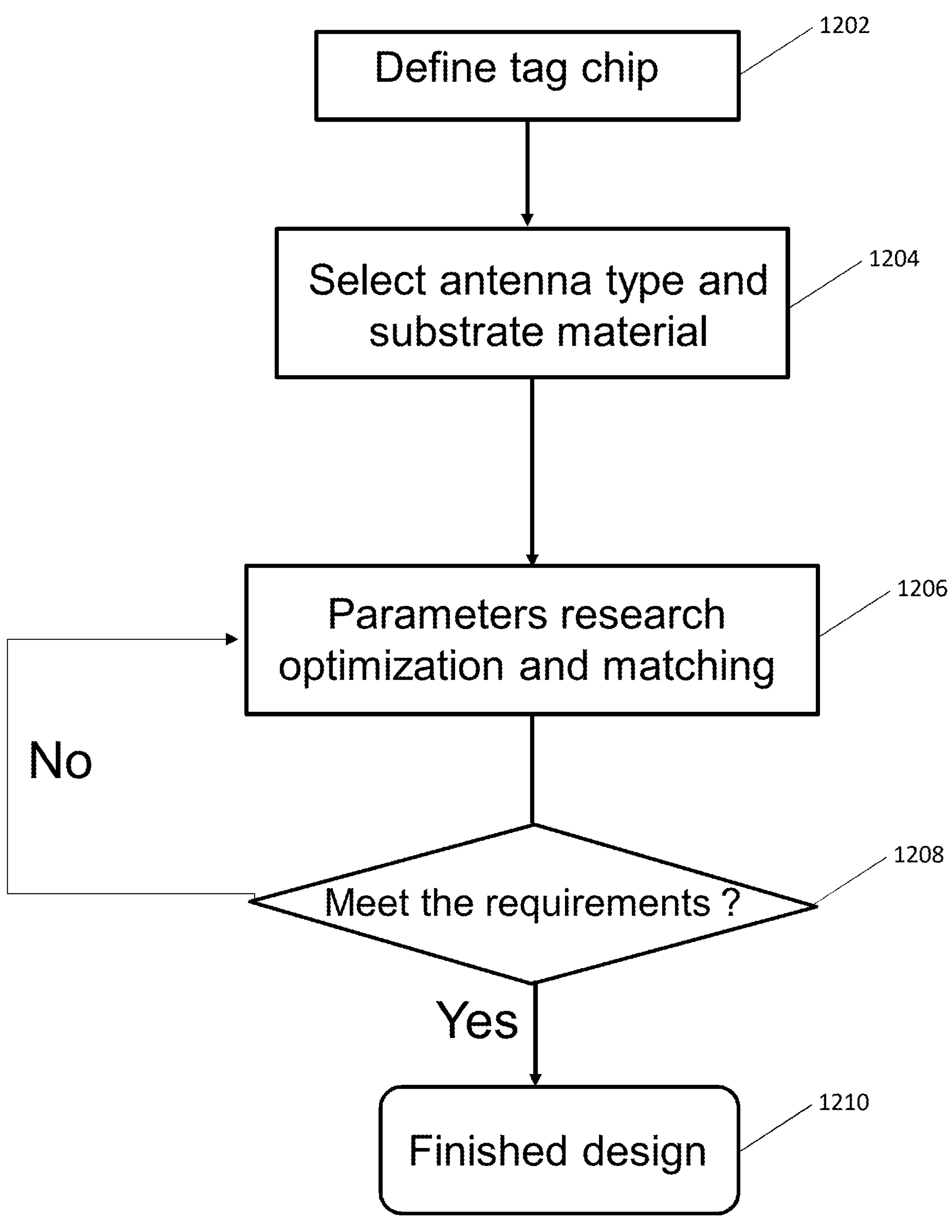
FIG. 9 is a flow chart showing a method of determining the design parameters of an RFID tag antenna according an embodiment of the present invention.

FIG. 9 is a flow chart showing a method of determining the design parameters of an RFID tag antenna according an embodiment of the present invention.

Initially, in step 1202, the tag chip is selected and from this, the input impendence of the tag chip is known. In step 1204, the antenna type and substrate material are selected.

Then, in step 1206, parameters are researched and optimized. This step may involve adjusting the length of the loop feed structure to adjust the input impedance of the antenna to match the impedance of the integrated circuit chip. In order to realize the maximum energy transmission between tag and chip, conjugate matching is adopted. Therefore, the input impedance of the antenna should also be adjusted when changing the chip. As shown in FIG. 9, the parameters and optimized and in step 1208 checks are carried out whether the impedance matching requirements are met. If the requirements are met then the design is finalized in step 1210. If not, the method returns to step 1206 and further optimization is carried out.

As described above, present disclosure provides a highly miniaturized dual-band UHF RFID tag antenna for tagging small metallic objects. In an example embodiment the total volume is only 20 mm×30 mm×1.5 mm. This tag can be used for planar platforms as well as platforms requiring conformal, such as metal cylinders and bearings.

Further, the present disclosure provides a very simple and compact folded dipole structure has been designed for anti-metal UHF tag antenna. The proposed tag is able to achieve a large reading distance of more than 4 m. The proposed tag antenna has a very thin thickness and can be easily made to be flexible conformal to some curved surfaces.

Whilst the foregoing description has described exemplary embodiments, it will be understood by those skilled in the art that many variations of the embodiments can be made within the scope and spirit of the present invention.

The invention claimed is:

1. A dual-band RFID tag antenna for mounting on a metallic object, the dual-band RFID tag antenna comprising:

a dielectric substrate having a first surface and a second surface opposing the first surface;

a conductive layer provided on the first surface of the dielectric substrate, the conductive layer being configured to be attached to a surface of the metallic object;

an integrated circuit mounted on the second surface of the dielectric substrate;

an antenna structure formed on the second surface of the dielectric substrate, the antenna structure configured to have a first resonance at a first frequency band and a second resonance at a second frequency band;

a loop feed structure formed on the second surface of the dielectric substrate, the feed loop structure configured to electromagnetically couple the antenna structure to the integrated circuit;

a first via pin passing through the dielectric substrate and electrically connecting a first point on the antenna structure with a corresponding first point on the conductive layer; and a second via pin passing through the dielectric substrate and electrically connecting a second point on the antenna structure with a corresponding second point on the conductive layer, wherein the first resonance is an omnidirectional resonance and the second resonance is directional resonance.

2. The dual-band RFID tag antenna according to claim 1, wherein the dielectric substrate is formed from a flexible material.

3. The dual-band RFID tag antenna according to claim 1, wherein the antenna structure comprises two antenna parts arranged in a dipole structure.

4. The dual-band RFID tag antenna according to claim 3, wherein each antenna part comprises a first leg portion and a second leg portion.

5. The dual-band RFID tag antenna according to claim 4, wherein a resonant length of each antenna part corresponds to a length from an end of the first leg portion to an end of the second leg portion.

6. The dual-band RFID tag antenna according to claim 5, wherein the end of the first leg portion of a first antenna part corresponds to the first point on the antenna structure and the end of the first leg portion of a second antenna part correspond to the second point on the antenna structure.

7. The dual-band RFID tag according to claim 4, wherein the second leg portion of each antenna part comprises a bend towards a non-peripheral part of the second surface of the dielectric substrate.

8. The dual-band RFID tag antenna according to claim 1, wherein the dielectric substrate is rectangular.

9. The dual-band RFID tag antenna according to claim 8, wherein the first point on the antenna structure and the second point on the antenna structure correspond to diagonally opposite corners of the dielectric substrate.

10. The dual-band RFID tag antenna according to claim 1, wherein the antenna structure comprises coupling portions arranged adjacent to the loop feed structure.

11. The dual-band RFID antenna according to claim 10, wherein the coupling portions have a straight edge on a side facing the loop feed structure.

12. The dual-band RFID antenna according to claim 10, wherein the coupling portions have a stepped edge on a side facing away from the loop feed structure.

13. A dual-band RFID tag antenna for mounting on a metallic object, the dual-band RFID tag antenna comprising:

a dielectric substrate having a first surface and a second surface opposing the first surface;

a conductive layer provided on the first surface of the dielectric substrate, the conductive layer being configured to be attached to a surface of the metallic object;

an integrated circuit mounted on the second surface of the dielectric substrate;

an antenna structure formed on the second surface of the dielectric substrate, the antenna structure configured to have a first resonance at a first frequency band and a second resonance at a second frequency band, wherein the antenna structure comprises two antenna parts arranged in a dipole structure, each antenna part comprising a first leg portion and a second leg portion, wherein a resonant length of each antenna part corresponds to a length from an end of the first leg portion to an end of the second leg portion;

a loop feed structure formed on the second surface of the dielectric substrate, the feed loop structure configured to electromagnetically couple the antenna structure to the integrated circuit;

a first via pin passing through the dielectric substrate and electrically connecting a first point on the antenna structure with a corresponding first point on the conductive layer; and a second via pin passing through the dielectric substrate and electrically connecting a second point on the antenna structure with a corresponding second point on the conductive layer.

14. A dual-band RFID tag antenna for mounting on a metallic object, the dual-band RFID tag antenna comprising:

a dielectric substrate having a first surface and a second surface opposing the first surface;

a conductive layer provided on the first surface of the dielectric substrate, the conductive layer being configured to be attached to a surface of the metallic object;

an integrated circuit mounted on the second surface of the dielectric substrate;

an antenna structure formed on the second surface of the dielectric substrate, the antenna structure configured to have a first resonance at a first frequency band and a second resonance at a second frequency band;

a loop feed structure formed on the second surface of the dielectric substrate, the feed loop structure configured to electromagnetically couple the antenna structure to the integrated circuit;

a first via pin passing through the dielectric substrate and electrically connecting a first point on the antenna structure with a corresponding first point on the conductive layer; and a second via pin passing through the dielectric substrate and electrically connecting a second point on the antenna structure with a corresponding second point on the conductive layer, wherein the antenna structure comprises coupling portions arranged adjacent to the loop feed structure and the coupling portions have a stepped edge on a side facing away from the loop feed structure.

* * * * *